US010899074B2

(12) United States Patent
Achten et al.

(10) Patent No.: US 10,899,074 B2
(45) Date of Patent: *Jan. 26, 2021

(54) POWDER-BASED ADDITIVE MANUFACTURING PROCESS

(71) Applicant: Covestro Deutschland AG, Leverkusen (DE)

(72) Inventors: Dirk Achten, Leverkusen (DE); Thomas Buesgen, Leverkusen (DE); Michael Kessler, Cologne (DE); Peter Reichert, Dormagen (DE); Bettina Mettmann, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/764,524

(22) PCT Filed: Dec. 13, 2018

(86) PCT No.: PCT/EP2018/084662
§ 371 (c)(1),
(2) Date: May 15, 2020

(87) PCT Pub. No.: WO2019/121277
PCT Pub. Date: Jun. 27, 2019

(65) Prior Publication Data
US 2020/0307073 A1 Oct. 1, 2020

(30) Foreign Application Priority Data

Dec. 20, 2017 (EP) ..................... 17209193

(51) Int. Cl.
*B33Y 70/00* (2020.01)
*B29C 64/165* (2017.01)
*B29C 64/268* (2017.01)
*B29C 64/25* (2017.01)
*B29C 64/371* (2017.01)
*B29C 64/153* (2017.01)
*B33Y 10/00* (2015.01)
B29K 55/02 (2006.01)
B29K 67/00 (2006.01)
B29K 69/00 (2006.01)
B29K 75/00 (2006.01)
B29K 105/00 (2006.01)

(52) U.S. Cl.
CPC ............ *B29C 64/153* (2017.08); *B33Y 10/00* (2014.12); *B33Y 70/00* (2014.12); *B29K 2055/02* (2013.01); *B29K 2067/00* (2013.01); *B29K 2069/00* (2013.01); *B29K 2075/00* (2013.01); *B29K 2105/0094* (2013.01); *B29K 2105/251* (2013.01); *B29K 2995/007* (2013.01); *B29K 2995/0017* (2013.01)

(58) Field of Classification Search
CPC ..... B29C 64/165; B29C 64/188; B29C 64/25; B29C 64/268; B29C 64/371; B29K 2995/0012; B29K 2875/00; B29K 2995/0088; B29K 2995/007; B33Y 10/00; B33Y 70/00
See application file for complete search history.

(56) References Cited

U.S. PATENT DOCUMENTS

| | | | |
|---|---|---|---|
| 7,879,282 B2 | 2/2011 | Hopkinson et al. | |
| 8,535,036 B2 | 9/2013 | Hopkinson et al. | |
| 2005/0080191 A1 | 4/2005 | Kramer et al. | |
| 2006/0159896 A1 | 7/2006 | Pfeifer et al. | |
| 2015/0257313 A1* | 9/2015 | Yanke | B29C 64/112 174/388 |
| 2017/0129177 A1 | 5/2017 | Hattig et al. | |
| 2018/0111315 A1* | 4/2018 | Achten | B33Y 80/00 |
| 2018/0273720 A1* | 9/2018 | Huang | B29C 64/165 |
| 2019/0039294 A1* | 2/2019 | Stasiak | B29C 64/165 |
| 2019/0039296 A1* | 2/2019 | Prasad | C09C 1/48 |
| 2019/0047216 A1* | 2/2019 | Emamjomeh | B29C 64/165 |
| 2019/0184632 A1* | 6/2019 | Achten | B29C 64/153 |
| 2020/0262146 A1* | 8/2020 | Barnes | C08K 3/22 |

FOREIGN PATENT DOCUMENTS

WO WO 2015109143 A1 7/2015
WO WO 2018095967 A1 5/2018

OTHER PUBLICATIONS

International Search Report, PCT/EP2018/084662, dated Mar. 11, 2019, Authorized officer: C. Wellhausen.
Dupin, S. et al, Microstructurel origin of physical and mechanical properties of polyamide 12 processed by laser sintering, European Polymer Journal 48 (2012), pp. 1611-1621.

* cited by examiner

*Primary Examiner* — Nahida Sultana
(74) *Attorney, Agent, or Firm* — Jed C. Benson

(57) ABSTRACT

The invention relates to an additive manufacturing process (3D printing) using particles having a meltable polymer. The meltable polymer comprises a thermoplastic polyurethane polymer which has a melting range (DSC, Differential Scanning calorimetry; second heating at heating rate 5 K/min) of 160 to 270° C. and a Shore D hardness according to DIN ISO 7619-1 of 50 or more and which, at a temperature T, has a melt volume rate (melt volume rate (MVR)) according to ISO 1133 of 5 to 15 cm/10 min and a change of the MVR, when this temperature T increases by 20° C., of greater than or equal to 90 cm$^3$/10 min. The invention also relates to an item which can be obtained by means of the method.

14 Claims, No Drawings

POWDER-BASED ADDITIVE MANUFACTURING PROCESS

CROSS-REFERENCE TO RELATED APPLICATION

This application is a national stage application under 35 U.S.C. § 371 of PCT/EP2018/084662, filed Dec. 13, 2018, which claims the benefit of European Application No. 17209193, filed Dec. 20, 2017, each of which is incorporated herein by reference.

FIELD

The present invention relates to an additive manufacturing method using particles comprising a particular thermoplastic polyurethane. It further relates to an article produced by means of such particles.

BACKGROUND

Additive manufacturing methods refer to those methods by which articles are built up layer by layer. They therefore differ markedly from other methods of producing articles such as milling or drilling. In the latter methods, an article is processed such that it takes on its final geometry via removal of material.

Additive manufacturing methods use different materials and processing techniques to build up articles layer by layer. In fused deposition modeling (FDM), for example, a thermoplastic wire is liquefied and deposited layer by layer on a movable build platform using a nozzle. Solidification gives rise to a solid article. The nozzle and build platform are controlled on the basis of a CAD drawing of the article. If the geometry of this article is complex, for example with geometric undercuts, support materials additionally have to be printed and removed again after completion of the article.

In addition, there exist additive manufacturing methods that use thermoplastic powders to build up articles layer by layer. In this case, by means of what is called a coater, thin layers of powder are applied and then selectively melted by means of an energy source. The surrounding powder here supports the component geometry. Complex geometries can thus be manufactured more economically than in the above-described FDM method. Moreover, different articles can be arranged or manufactured in a tightly packed manner in what is called the powder bed. Owing to these advantages, powder-based additive manufacturing methods are among the most economically viable additive manufacturing methods on the market. They are therefore used predominantly by industrial users. Examples of powder-based additive manufacturing methods are what are called selective laser sintering (SLS) or high-speed sintering (HSS). They differ from one another in the method for introducing energy for the selective melting into the plastic. In the laser sintering method, the energy is introduced via a deflected laser beam. In what is called the high-speed sintering (HSS) method (EP 1648686), the energy is introduced via infrared (IR) sources in combination with an IR absorber selectively printed into the powder bed. What is called selective heat sintering (SHS) utilizes the printing unit of a conventional thermal printer in order to selectively melt thermoplastic powders.

On the basis of the polymers that are nowadays used predominantly in powder-based additive manufacturing methods, articles are formed that have mechanical properties that can differ fundamentally from the characteristics of the materials as known in other plastics processing methods, such as injection molding. When processed by the additive manufacturing methods, the thermoplastic materials used lose their specific characteristics.

Nylon-12 (PA12) is the material currently most commonly used for powder-based additive manufacturing methods, for example laser sintering. PA12 is notable for high strength and toughness when it is processed by injection molding or by extrusion. A commercial PA12, for example, after injection molding has an elongation at break of more than 200%. PA12 articles that are produced by the laser sintering method, by contrast, show elongations at break around 15%. The component is brittle and therefore can no longer be regarded as a typical PA12 component. The same is true of polypropylene (PP), which is supplied in powder form for laser sintering. This material too becomes brittle and hence loses the tough, elastic properties that are typical of PP. The reasons for this are to be found in the morphology of the polymers.

During the melting operation by means of laser or IR and especially in the course of cooling, an irregular inner structure of the so-called semicrystalline polymers arises (for example PA12 and PP). The inner structure (morphology) of semicrystalline polymers is partly characterized by a high level of order. A certain proportion of the polymer chains forms crystalline, tightly packed structures in the course of cooling. During melting and cooling, these crystallites grow irregularly at the boundaries of the incompletely molten particles and at the former grain boundaries of the powder particles and on additives present in the powder. The irregularity of the morphology thus formed promotes the formation of cracks under mechanical stress. The residual porosity which is unavoidable in the powder-based additive method promotes the growth of cracks.

Brittle properties of the components thus formed are the result. For elucidation of this effect, reference is made to European Polymer Journal 48 (2012), pages 1611-1621. The elastic polymers based on block copolymers that are used in laser sintering also show a profile of properties untypical of the polymers used when they are processed as powder by additive manufacturing methods to give articles. Thermoplastic elastomers (TPE) are nowadays used in laser sintering. Articles that are produced from the TPEs now available have high residual porosity after solidification, and the original strength of the TPE material is not measurable in the article manufactured therefrom. In practice, these porous components are therefore subsequently infiltrated with liquid, hardening polymers in order to establish the profile of properties required. In spite of this additional measure, strength and elongation remain at a low level. The additional process complexity—as well as the still-inadequate mechanical properties—leads to poor economic viability of these materials.

In laser sintering methods using polymer particles, these are generally processed in a closed volume or chamber in order that the particles can be processed in a heated atmosphere. In this way it is possible to reduce the temperature differential that has to be overcome for sintering of the particles by action of the laser. In general, it can be stated that the thermal properties of the polymer affect the possible processing temperatures in laser sintering methods. Therefore, the prior art has proposed various solutions for such polymers and methods of processing them.

WO 03/106146 A1 discloses particles for use in selective laser sintering (SLS) comprising a core of at least one first material, an at least partial coating of the core with a second material, where the second material has a lower softening temperature than the first material. The softening temperature of the second material is less than about 70° C. This document further discloses a process for producing a three-dimensional article by means of SLS, having the steps of: applying a layer of particles to a target surface; irradiating a selected portion of the layer corresponding to a cross section of the article with a beam of energy such that the particles in the selected portion are bonded; repeating the steps of applying and irradiating for a multitude of layers, such that the bonded portions of the adjacent layers become bonded in order to form the article. Particles containing at least one material having a softening temperature of less than about 70° C. are used.

WO 2015/197515 A1 describes a thermoplastic pulverulent composition comprising 0.02% to 0.5% by weight, based on the total amount of composition, of plasticizer and pulverulent thermoplastic polyurethane, where at least 90% by weight of the composition has a particle diameter of less than 0.25 mm, where the thermoplastic polyurethane is obtainable from the reaction of components a) at least one organic diisocyanate, b) at least one compound having groups reactive toward isocyanate groups and having a number-average molecular weight ($M_n$) of 500 g/mol to 6000 g/mol and a number-average functionality of the totality of the components under b) of 1.8 to 2.5, c) at least one chain extender having a molecular weight ($M_n$) of 60-450 g/mol and a number-average functionality of the totality of the chain extenders under c) of 1.8 to 2.5, in the presence of d) optionally catalysts, e) optionally auxiliaries and/or additives, f) optionally one or more chain terminators.

The thermoplastic polyurethane according to WO 2015/197515 A1 has a melting range (DSC, differential scanning calorimetry; second heating operation at heating rate 5 K/min) of 20 to 170° C. and a Shore A hardness to DIN ISO 7619-1 of 50 to 95, has a melt volume rate (MVR) at a temperature T to ISO 1133 of 5 to 15 cm$^3$/10 min and a change in MVR in the case of an increase in this temperature T by 20° C. of less than 90 cm$^3$/10 min. The end use is the production of articles in powder-based additive manufacturing methods.

US 2005/0080191 A1 relates to a powder system for use in solid freeform fabrication methods, comprising at least one polymer having reactive properties and fusible properties, wherein the at least one polymer is selected in order to react with a liquid binder and is fusible at a temperature above the melting point or glass transition temperature of the at least one polymer. The at least one polymer may comprise at least one reactive polymer and at least one fusible polymer, and the at least one fusible polymer may have a melting point or glass transition temperature in the range from about 50° C. to about 250° C.

WO 2015/109143 A1 discloses systems and processes for the freeform fabrication of solids, especially laser sintering methods, and various articles obtained by the methods. The systems and processes use particular thermoplastic polyurethanes derived from (a) a polyisocyanate component (b) a polyol component and (c) an optional chain extension component, where the thermoplastic polyurethane polymer obtained has an enthalpy of fusion of at least 5.5 J/g, a crystallization temperature Tc of more than 70° C. and a Δ(Tm:Tc) of 20 degrees to 75 degrees, where Δ(Tm:Tc) is the difference between Tm (melting temperature) and Tc.

In the prior art, there still exists a need for powder-based additive manufacturing methods in which polymers having high mechanical strengths, high component strength and high heat distortion resistance can be used and in which the components obtained have homogeneous material properties.

SUMMARY

What is proposed in accordance with the invention is a method of producing an article, comprising the steps of:
applying a layer of particles to a target surface;
introducing energy into a selected portion of the layer corresponding to a cross section of the article in a chamber to bond the particles in the selected portion;
repeating the steps of applying and introducing energy for a multitude of layers to bond the bonded portions of the adjacent layers in order to form the article;
where at least some of the particles include a fusible polymer;
where the fusible polymer comprises a thermoplastic polyurethane polymer having
a melting range (DSC, differential scanning calorimetry; second heating run at a heating rate of 5 K/min) of 160° C. to 270° C. and
a Shore D hardness to DIN ISO 7619-1 of 50 or more and a melt volume flow rate (MVR) at a temperature T to ISO 1133 of 5 to 15 cm$^3$/10 min and
a change in the MVR in the event of an increase of this temperature T by 20° C. of ≥90 cm$^3$/10 min.

DETAILED DESCRIPTION

In the method of the invention, an article is built up layer by layer. If the number of repetitions for applying and irradiating is sufficiently low the article to be constructed may also be referred to as a two-dimensional article. Such a two-dimensional article can also be characterized as a coating. For example, for construction thereof, ≥2 to ≤20 repetitions for application and irradiation can be conducted.

It is envisaged that at least some of the particles include a fusible polymer. Preferably, all the particles used in the process include a fusible polymer. It is further preferable that at least 90% by weight of the particles have a particle diameter of ≤0.1 mm, preferably ≤0.5 mm, more preferably ≤0.2 mm. The particles comprising the fusible polymer may have, for example, a homogeneous construction such that no further fusible polymers are present in the particles.

The energy source for bonding of the particles may be electromagnetic energy, for example UV to IR light. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles of the particles to one another.

As well as the fusible polymer, the particles may also comprise further additives such as fillers, stabilizers and the like, but also further polymers. The total content of additives in the particles may, for example, be ≥0.1% by weight to ≤50% by weight, preferably ≥0.5% by weight to ≤30% by weight, more preferably ≥1% by weight to ≤10% by weight.

In the DSC analysis, the material is subjected to the following temperature cycle: 1 minute at minus 60° C., then heating to 260° C. at 20 kelvin/minute, then cooling to minus 60° C. at 20 kelvin/minute, then 1 minute at minus 60° C., then heating to 260° C. at 20 kelvin/minute.

The thermoplastic polyurethane powder has steep melting characteristics. Melting characteristics are determined via the change in MVR (melt volume rate) to ISO 1133 with a preheating time of 5 minutes and 10 kg as a function of temperature. Melting characteristics are considered to be "steep" when the MVR at a starting temperature Tx has a starting value of 5 to 15 cm³/10 min and increases by ≥90 cm³/10 min as a result of an increase in temperature by 20° C. to Tx+20.

The temperature T that serves as a reference point for the determination of melting characteristics is preferably within a range from ≥150° C. to ≤270° C., more preferably ≥160° C. to ≤265° C. and especially preferably ≥170° C. to ≤260° C.

The fusible polymer has a melting range of ≥160° C. to ≤270° C., preferably of ≥165° C. to ≤260° C. and more preferably of ≥170° C. to ≤250° C. In the DSC analysis for determination of the melting range, the material is subjected to the following temperature cycle: 1 minute at −60° C., then heating to 260° C. at 20 kelvin/minute, then cooling to −60° C. at 20 kelvin/minute, then 1 minute at −60° C., then heating to 260° C. at 20 kelvin/minute.

It is possible that the temperature interval between the start of the melting operation and the end of the melting operation as determinable according to the above DSC protocol is ≤50° C., preferably ≤30° C. and more preferably ≤20° C.

The choice of thermoplastic polyurethane polymer in the method of the invention has the advantage that high-melting, sharp-melting hard TPUs typically have a high heat distortion resistance. Such properties are particularly sought-after in the field of industrial articles in the transport sector. The fact that such products based on thermoplastic polyurethanes are processable in a powder sintering process was unknown to date.

The heat distortion resistance to DIN EN ISO 75-1,-2,-3 Method b for products of the invention is >100° C., preferably >120° C., more preferably >140° C. and most preferably >150° C.

Preferably, the fusible polymer is a polyurethane at least partly obtainable from the reaction of aromatic and/or aliphatic polyisocyanates with suitable (poly)alcohols and/or (poly)amines or blends thereof. Preferably, at least a proportion of the (poly)alcohols used comprises those from the group consisting of: linear polyester polyols, polyether polyols, polycarbonate polyols, polyacrylate polyols or a combination of at least two of these. In a preferred embodiment, these (poly)alcohols or (poly)amines bear terminal alcohol and/or amine functionalities. In a further preferred embodiment, the (poly)alcohols and/or (poly)amines have a molecular weight of 52 to 10 000 g/mol. Preferably, these (poly)alcohols or (poly)amines as feedstocks have a melting point in the range from 5 to 150° C. Preferred polyisocyanates that can be used at least in a proportion for preparation of the fusible polyurethanes are TDI, MDI, HDI, PDI, H12MDI, IPDI, TODI, XDI, NDI and decane diisocyanate. Particularly preferred polyisocyanates are HDI, PDI, H12MDI, MDI and TDI.

If appropriate, in the reaction to give the polyurethane, it is also possible to use diols from the molecular weight range of ≥62 to ≤600 g/mol as chain extenders.

The polyisocyanate component may comprise a symmetric polyisocyanate and/or a nonsymmetric polyisocyanate. Examples of symmetric polyisocyanates are 4,4'-MDI and HDI.

In the case of nonsymmetric polyisocyanates, the steric environment of one NCO group in the molecule is different from the steric environment of a further NCO group. In that case, one isocyanate group reacts more quickly with groups reactive toward isocyanates, for example OH groups, while the remaining isocyanate group is less reactive. One consequence of the nonsymmetric structure of the polyisocyanate is that the polyurethanes formed with these polyisocyanates also have a less linear structure.

Examples of suitable nonsymmetric polyisocyanates are selected from the group consisting of: 2,2,4-trimethylhexamethylene diisocyanate, ethylethylene diisocyanate, nonsymmetric isomers of dicyclohexylmethane diisocyanate ($H_{12}$-MDI), asymmetric isomers of 1,4-diisocyanatocyclohexane, asymmetric isomers of 1,3-diisocyanatocyclohexane, asymmetric isomers of 1,2-diisocyanatocyclohexane, asymmetric isomers of 1,3-diisocyanatocyclopentane, asymmetric isomers of 1,2-diisocyanatocyclopentane, asymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), derivatives of the diisocyanates listed, especially dimerized or trimerized types, or a combination of at least two of these.

Preference is given to 4,4'-MDI or a mixture comprising IPDI and HDI as polyisocyanate component.

Embodiments and further aspects of the invention are described hereinbelow. They may be combined with one another as desired unless the opposite is clear from the context.

In a preferred embodiment of the method of the invention, the introducing of energy into a selected portion of the layer corresponding to a cross section of the article to bond the particles in the selected portion comprises the following step:

irradiating a selected portion of the layer corresponding to a cross section of the article with a beam of energy in the chamber such that the particles in the selected portion are bonded.

This form of the method can be regarded as a selective sintering method, especially as a selective laser sintering method (SLS). The beam of energy for bonding of the particles may be a beam of electromagnetic energy, for example a "light beam" of UV to IR light. Preferably, the beam of energy is a laser beam, more preferably having a wavelength between 600 nm and 15 μm. The laser may take the form of a semiconductor laser or of a gas laser. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles to one another.

In a further preferred embodiment of the method of the invention, the introducing of energy into a selected portion of the layer corresponding to a cross section of the article to bond the particles in the selected portion comprises the following steps:

applying a liquid to a selected portion of the layer corresponding to a cross section of the article, where said liquid increases the absorption of energy in the regions of the layer with which it comes into contact relative to the regions with which it does not come into contact;

irradiating the layer in the chamber such that the particles in regions of the layer that come into contact with the liquid are bonded to one another and the particles in regions of the layer that do not come into contact with the liquid are not bonded to one another.

In this embodiment, for example, a liquid comprising an IR absorber can be applied to the layer by means of inkjet methods. The irradiation of the layer leads to selective heating of those particles that are in contact with the liquid including the IR absorber. In this way, bonding of the particles can be achieved.

The energy source for selective bonding of the particles is especially a UV to IR source. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles of the particles to one another.

In a further preferred embodiment of the method of the invention, the particles applied are at least intermittently heated or cooled. Suitable cooling methods include the cooling of one or more walls of a construction space chamber or the providing of cold, inert gas within the chamber. It is alternatively possible that the interior of the chamber is not heated at least at times. In that case, the thermal energy introduced by the action of energy is exploited to maintain the desired temperature in the chamber.

In a further preferred embodiment of the method of the invention, the thermoplastic polyurethane polymer has a Shore hardness (DIN ISO 7619-1) of ≥50 Shore D to ≤85 Shore D. Preference is given to Shore hardnesses of ≥60D to ≤80D, more preferably ≥65D to ≤75D.

In a further preferred embodiment of the method of the invention, the fusible polymer, as well as the polyurethane polymer, comprises a further polymer selected from the group consisting of polyester, ABS (acrylonitrile-butadiene-styrene), polycarbonate or a combination of at least two of these.

In a further preferred embodiment of the method of the invention, the fusible polymer is a blend comprising the polyurethane polymer and ABS, where the polyurethane polymer has a melting point (DSC, differential scanning calorimetry; second heating run at heating rate 20 K/min) of ≥160° C. and the proportion of the ABS in the blend is ≥1% by weight to ≤40% by weight (preferably ≥2% by weight to ≤20% by weight, more preferably ≥3% by weight to ≤15% by weight), based on the total weight of the blend.

In a further preferred embodiment of the method of the invention, the fusible polymer is a blend comprising the polyurethane polymer and a polyester, where the polyurethane polymer has a melting point (DSC, differential scanning calorimetry; second heating run at heating rate 20 K/min) of ≥160° C. and the proportion of the polyester in the blend is ≥1% by weight to ≤40% by weight (preferably ≥2% by weight to ≤20% by weight, more preferably ≥3% by weight to ≤15% by weight), based on the total weight of the blend.

In a further preferred embodiment of the method of the invention, the fusible polymer is a blend comprising the polyurethane polymer and a polycarbonate based on bisphenol A (2,2-bis(4-hydroxyphenyl)propane) and/or bisphenol TMC (1,1-bis(4-hydroxyphenyl)-3,3,5-trimethylcyclohexane), where the polyurethane polymer has a melting point (DSC, differential scanning calorimetry; second heating run at heating rate 20 K/min) of ≥160° C. and the proportion of the polycarbonate in the blend is ≥1% by weight to ≤40% by weight (preferably ≥2% by weight to ≤20% by weight, more preferably ≥3% by weight to ≤15% by weight), based on the total weight of the blend.

In a further preferred embodiment of the method of the invention, at least some of the particles include the fusible polymer and a further polymer and/or inorganic particles. In that case, what are called co-powders are used. The further polymer may form one or more phases with the fusible polymer. It may be entirely or partly melted by introduction of the beam of energy in the chamber or else remain in the solid state. Examples of inorganic particles are fillers such as silica, limestone flour, natural ground chalks (calcium carbonates or calcium magnesium carbonates), barytes, talc, mica, clays or, if appropriate, also carbon black. The total proportion of the further polymer and/or the inorganic particles may, for example, be ≥5% by weight to ≤50% by weight, based on the total weight of the particles.

In a further preferred embodiment of the method of the invention, the article formed is subjected to an aftertreatment selected from the group consisting of: mechanical smoothing of the surface, controlled local heating, heating of the entire article, controlled local cooling, cooling of the entire article, contacting of the article with steam, contacting of the article with the vapor of an organic solvent, irradiating the article with electromagnetic radiation, immersing the article into a liquid bath, or a combination of at least two of these. Aftertreatments of this kind serve particularly to improve the surface quality of the article.

In a further preferred embodiment of the method of the invention, the particles, after the step of applying a layer of particles to the target surface, are at least partly suspended in a liquid phase. The liquid phase can be removed at a later stage in the method. After the application of a particle layer, it is thus possible to selectively provide a region of the particle layer with an ink which, in combination with the beam of energy, leads to bonding of the particles to one another. In this way, elements of the high-speed sintering (HSS) method are adopted.

In a further preferred embodiment of the method of the invention, that portion of the particles that includes a fusible polymer is selected such that the particles retain their original flowability after storage at 150° C. under a nitrogen atmosphere for >2 h, preferably >4 h and more preferably >8 h hours. Thus, these particles do not form lumps if the construction space for the additive manufacturing method is heated.

Preferably, the polyurethane polymer at 140° C. has a storage modulus E' (dynamic-mechanical analysis to ISO 6721-10) of ≥$10^7$ Pa. The polyurethane polymer preferably has a storage modulus E' at 150° C. of ≥$10^7$ Pa, more preferably a storage modulus E' at 160° C. of ≥$10^7$ Pa.

In a further preferred embodiment of the method of the invention, that portion of the particles that includes a fusible polymer, after storage at 140° C. (preferably 150° C.) under a nitrogen atmosphere for 8 hours, has a color change (EN ISO 11664-4) of ≤10 ΔE.

In a further preferred embodiment of the method of the invention, the polyurethane polymer, after storage at 150° C. under a nitrogen atmosphere for 8 hours, has a change in viscosity in the melt at a temperature T=10° C.>$T_{off}$ melting point of <+−50%.

The invention further relates to a thermoplastic pulverulent composition comprising pulverulent thermoplastic polyurethane, wherein the thermoplastic polyurethane is obtainable from the reaction of the following components:
a) at least one organic diisocyanate,
b) at least one compound having groups reactive toward isocyanate groups and having a number-average molecular weight (Mn) of 500 g/mol to 6000 g/mol and a number-average functionality of the sum total of the components b) of 1.8 to 2.5,
c) at least one chain extender having a molecular weight (Mn) of 60 to 450 g/mol and a number-average functionality of the sum total of the chain extenders c) of 1.8 to 2.5, in the presence of
d) optionally catalysts,
e) optionally auxiliaries and/or additives,
f) optionally one or more chain terminators,
wherein the thermoplastic polyurethane has a melting range (DSC, differential scanning calorimetry; second heating run at heating rate 5 K/min) of 160 to 270° C. and a Shore D hardness to DIN ISO 7619-1 of 50 or more and which has a melt volume flow rate (MVR) at a temperature T to ISO 1133 of 5 to 15 cm³/10 min and a change in MVR in the event of an increase in this temperature T by 20° C. of ≥90 cm³/10 min,
for production of articles in powder-based additive manufacturing methods, especially the method described above.

Preferably, the thermoplastic pulverulent composition includes 0.02% to 0.5% by weight, more preferably 0.05% to 0.4% by weight, especially preferably 0.1% to 0.3% by weight, of flow agent, based on the total amount of thermoplastic pulverulent composition. The flow agent is typically an inorganic powdered substance, where at least 90% by weight of the flow agent has a particle diameter of less than 25 μm (measured by means of laser diffraction) and the substance is preferably selected from the group consisting of hydrated silicon dioxides, hydrophobized fumed silicas, amorphous aluminum oxide, vitreous silicon dioxides, vitreous phosphates, vitreous borates, vitreous oxides, titanium dioxide, talc, mica, fumed silicon dioxides, kaolin, attapulgite, calcium silicates, aluminum oxide and magnesium silicates.

Further preferably, at least 90% by weight of the composition has a particle diameter of ≤0.25 mm, preferably of ≤0.2 mm, more preferably of ≤0.15 mm, measured by laser diffraction.

The components, such as components d) to f), may be selected from all the components that are commonly used by the person skilled in the art in association with thermoplastic polyurethanes. These components are preferably those as described for the purpose in WO 2015/197515 A1 and are also preferably used in amounts as described therein for production of the thermoplastic polyurethane.

The thermoplastic polyurethane present in the thermoplastic pulverulent composition may preferably have all the properties and constituents as described above for the thermoplastic polyurethane in association with the method of the invention.

The invention further relates to an article produced by the method of the invention or by means of the composition of the invention.

In a further preferred embodiment of the article, sintered thermoplastic polyurethane present in the article has a tan delta value (by dynamic-mechanical analysis) that varies by ≤0.2 (preferably ≤0.15 and more preferably ≤0.1) in the temperature range between 0° C. and 100° C.

EXAMPLES

The present invention is elucidated in detail by the examples which follow, but without being limited thereto. Percentages by weight are based on the total amount of reactive organic constituents used (alcohols, amines, water, isocyanates).

TPUs usable in accordance with the invention and TPUs for comparative examples have been produced by two standard processing methods: the prepolymer method and the one-shot/static mixer method.

In the prepolymer method, the polyol or polyol mixture is preheated to 180 to 210° C., initially charged with a portion of the isocyanate, and converted at temperatures of 200 to 240° C. The speed of the twin-screw extruder used here is about 270 to 290 rpm. This preceding partial reaction affords a linear, slightly pre-extended polymer that reacts to completion with residual isocyanate and chain extender further down the extruder. This method is described by way of example in EP-A 747 409.

In the one-shot/static mixer method, all comonomers are homogenized by means of a static mixer or another suitable mixing device at high temperatures (above 250° C.) within a short time (below 20 s) and then reacted to completion and discharged by means of a twin-screw extruder at temperatures of 90 to 240° C. and a speed of 260-280 rpm. This method is described by way of example in application DE 19924089.

The thermal-mechanical characteristics of the TPUs obtained were ascertained on injection-molded specimen plaques having dimensions 50 mm*10 mm*1 mm. The measurement parameters for the DMA measurements were a frequency of 1 Hz and a heating rate of 2° C./min over a temperature interval of −150° C. to 250° C., in accordance with DIN-EN-ISO 6721-4.

Example 1

The TPU (thermoplastic polyurethane) was prepared by the prepolymer method from 1 mol of polyether polyol mixture (DuPont) having a number-average molecular weight of 1500 g/mol, based on polytetramethylene ether glycol, and 8.51 mol of butane-1,4-diol; 9.51 mol of technical grade diphenylmethane 4,4'-diisocyanate (MDI) with >98% by weight of 4,4'-MDI; 0.5% by weight of Irganox® 1010 (pentaerythritol tetrakis(3-(3,5-di-tert-butyl-4-hydroxyphenyl)propionate) from BASF SE and 0.1% by weight of Loxamid 3324 (N,N'-ethylenebisstearylamide).

A polyurethane having a glass transition temperature (DMA measurement, maximum of the loss modulus E") of −55° C., a Shore D hardness (ISO 868) of an injection-molded specimen of 70 to 74 and a melting range (ISO 11357-3) of 170° C. to 250° C. was obtained.

Example 2

The TPU (thermoplastic polyurethane) was prepared by the prepolymer method from 1 mol of polyester diol (Covestro) having a number-average molecular weight of about 2000 g/mol, based on adipic acid, hexanediol and neopentyl glycol, and 4.85 mol of 2,2'-(1,4-phenylenedioxy)diethanol; 5.85 mol of technical grade diphenylmethane 4,4'-diisocyanate (MDI) with >98% by weight of 4,4'-MDI; 0.03% by weight of Irganox® 1010 (pentaerythritol tetrakis(3-(3,5-di-tert-butyl-4-hydroxyphenyl)propionate) from BASF SE) and 100 ppm of tin dioctoate, and 0.5% by weight of Loxamid 3324 (N,N'-ethylenebisstearylamide).

A polyurethane having a glass transition temperature (DMA measurement, maximum of the loss modulus E") of −13° C., a Shore D hardness (ISO 868) of an injection-molded specimen of 60 to 64 and a melting range (ISO 11357-3) of 195° C. to 258° C. was obtained.

Comparative Example V1

The TPU (thermoplastic polyurethane) was prepared by the static mixer-extruder method from 1 mol of polyester diol (Covestro) having a number-average molecular weight of about 900 g/mol, based on about 56.7% by weight of adipic acid and about 43.3% by weight of butane-1,4-diol, and about 1.45 mol of butane-1,4-diol, about 0.22 mol of hexane-1,6-diol, about 2.67 mol of technical grade diphenylmethane 4,4'-diisocyanate (MDI) with >98% by weight of 4,4'-MDI, 0.05% by weight of Irganox® 1010 (pentaerythritol tetrakis(3-(3,5-di-tert-butyl-4-hydroxyphenyl)propionate) from BASF SE), 1.1% by weight of Licowax® E (montanic esters from Clariant) and 250 ppm of tin dioctoate.

A polyurethane having a glass transition temperature (DMA measurement, maximum of the loss modulus E") of −24° C., a Shore A hardness (ISO 868) of an injection-molded specimen of 90 to 94 and a melting range (ISO 11357-3) of 63° C. to 175° C. was obtained.

Comparative Example V2

The TPU was prepared by the static mixer-extruder method from 1 mol of polyester diol (Covestro) having a number-average molecular weight of about 900 g/mol, based on about 56.7% by weight of adipic acid and about 43.3% by weight of butane-1,4-diol, and about 1.77 mol of butane-1,4-diol, about 2.77 mol of technical grade diphenylmethane 4,4'-diisocyanate (MDI) with >98% by weight of 4,4'-MDI, 0.05% by weight of Irganox® 1010 (pentaerythritol tetrakis(3-(3,5-di-tert-butyl-4-hydroxyphenyl)propionate) from BASF SE), 0.2% by weight of octanol and 200 ppm of tin dioctoate.

A polyurethane having a glass transition temperature (DMA measurement, maximum of the loss modulus E") of −18° C., a Shore A hardness (ISO 868) of an injection-molded specimen of 90 to 94 and a melting range (ISO 11357) of 79° C. to 170° C. was obtained.

The following table summarizes the measurements obtained:

| Example | Tg [° C.] | Shore A | Shore D | Melting range [° C.] | $T_{MVR}$ [° C.] | $MVR_{T+20°\ C.}$ [cm$^3$/10 min] |
|---|---|---|---|---|---|---|
| 1 | 55 | | 70-74 | 170-250 | 220 | >100 |
| 2 | −13 | | 60-64 | 195-258 | 237 | >100 |
| V1 | −24 | 90-94 | | 63-175 | 160 | 69 |
| V2 | −18 | 90-94 | | 79-170 | 170 | 48 |

$T_{MVR}$ [° C.] denotes the temperature at which the melt volume flow rate to ISO 1133 is within a range from 5 to 15 cm$^3$/10 min. $MVR_{T+20°\ C.}$ [cm$^3$/10 min] denotes the melt volume flow rate in the event of an increase in this temperature T by 20° C.

0.2% by weight, based on TPU, of hydrophobized fumed silica was added as flow agent (Aerosil® R972 from Evonik) to the TPUs prepared in examples 1 and 2 and comparative examples V1 and V2, and the mixture was processed mechanically under cryogenic conditions (cryogenic comminution) in a pinned-disk mill to give powder and then classified by means of a sieving machine. 90% by weight of the composition had a particle diameter of less than 140 μm (measured by means of laser diffraction (HELOS particle size analysis)).

Subsequently, S2 test specimens were produced by a powder sintering method.

The TPU powder materials obtained beforehand were sieved before each sintering experiment and introduced into the reservoir of the 3D powder printer used under protective gas atmosphere (nitrogen). Over the entire printing operation, the reservoir, construction space and overflow were under protective gas. The construction space was heated to the construction space temperature (see table) and adjusted about 15 minutes prior to commencement of the construction application. The sintering parameters can likewise be found in the table below. Every site to be sintered was in principle scanned twice with the laser beam in order to achieve better layer adhesion. After the construction application had ended, the construction space was allowed to cool gradually under protective gas and the powder cake was removed from the construction space. The sintered parts were freed of excess powder first roughly by mechanical means and then with compressed air, before they were subjected to mechanical/thermal studies.

| Example | Construction space temp. [° C.] | Laser power [W] | Layer thickness [mm] | Number of sintering operations per layer | Result |
|---|---|---|---|---|---|
| 1 | 170 | 64 | 0.15 | 2 | Component as specified |
| 2 | 170 | 64 | 0.15 | 2 | Component as specified |
| V1 | 160 | 56 | 0.15 | 2 | Completely sintered powder in the construction space |
| V2 | 160 | 54 | 0.15 | 2 | Completely sintered powder in the construction space |

The result that can be reported is that the TPU materials used in association with the method of the invention could be processed successfully in a 3D powder printer, while the materials from the comparative examples were unsuitable under the conditions of the invention.

The invention claimed is:

1. A method of producing an article, comprising:
applying a layer of particles to a target surface, wherein at least some of the particles include a fusible polymer;
introducing energy into a selected portion of the layer corresponding to a cross section of the article in a chamber to bond the particles in the selected portion to form a bonded portion; and
repeating the steps of applying and introducing energy for a multitude of layers to bond the bonded portions of adjacent layers in order to form the article;
wherein the fusible polymer comprises a thermoplastic polyurethane polymer having:
a melting range of 160° C. to 270° C. based on differential scanning calorimetry of a second heating run at a heating rate of 20 K/m in,
a Shore D hardness of 50 or more based on DIN ISO 7619-1,
a melt volume flow rate at a temperature T of 5 to 15 cm$^3$/10 min based on ISO 1133, and
a change in the melt volume flow rate of ≥90 cm$^3$/10 min in the event of an increase of temperature T by 20° C.

2. The method as claimed in claim 1, wherein introducing energy into a selected portion of the layer corresponding to a cross section of the article to bond the particles in the selected portion comprises:
irradiating the selected portion of the layer corresponding to a cross section of the article with an energy beam to bond the particles in the selected portion.

3. The method as claimed in claim 1, wherein introducing energy into a selected portion of the layer corresponding to a cross section of the article to bond the particles in the selected portion comprises:
applying a liquid to a selected portion of the layer corresponding to a cross section of the article, wherein said liquid increases the absorption of energy in regions of the layer with which it comes into contact relative to regions with which it does not come into contact;
irradiating the layer so that the particles in regions of the layer contacted with the liquid are bonded to one another and the particles in regions of the layer not contacted by the liquid are not bonded to one another.

4. The method as claimed in claim 1, wherein the particles applied are at least intermittently heated or cooled.

5. The method as claimed in claim 1, wherein the thermoplastic polyurethane polymer has a Shore hardness of ≥50 Shore D to ≤85 Shore D based on DIN ISO 7619-1.

6. The method as claimed in claim 1, wherein the fusible polymer comprises a further polymer selected from the group consisting of polyester, ABS, polycarbonate, and a combination of at least two of these.

7. The method as claimed in claim 6, wherein the fusible polymer is a blend comprising the polyurethane polymer and ABS, wherein the polyurethane polymer has a melting point of ≥160° C. based on differential scanning calorimetry of a second heating run at heating rate 20 K/min and a proportion of the ABS in the blend is ≥1% by weight to ≤40% by weight, based on a total weight of the blend.

8. The method as claimed in claim 6, wherein the fusible polymer is a blend comprising the polyurethane polymer and a polyester, wherein the polyurethane polymer has a melting point of ≥160° C. based on differential scanning calorimetry of a second heating run at heating rate 20 K/min and a proportion of polyester in the blend is ≤1% by weight to ≤40% by weight, based on a total weight of the blend.

9. The method as claimed in claim 6, wherein the fusible polymer is a blend comprising the polyurethane polymer and a polycarbonate based on bisphenol A and/or bisphenol TMC, wherein the polyurethane polymer has a melting point of ≥160° C. based on differential scanning calorimetry of a second heating run at heating rate 20 K/min and a proportion of polycarbonate in the blend is ≥1% by weight to ≤40% by weight, based on a total weight of the blend.

10. The method as claimed in claim 1, wherein at least some of the particles include the fusible polymer and a further polymer and/or an inorganic particles.

11. The method as claimed in claim 1, further comprising subjecting the article to an aftertreatment comprising: mechanical smoothing of the surface, controlled local heating, heating of the entire article, controlled local cooling, cooling of the entire article, contacting of the article with steam, contacting of the article with the vapor of an organic solvent, irradiating the article with electromagnetic radiation, immersing the article into a liquid bath, or a combination of at least two of these.

12. The method as claimed in claim 1, wherein the particles are at least partly suspended in a liquid phase after applying the layer of particles to the target surface.

13. The method as claimed in claim 1, wherein a portion of the particles that includes the fusible polymer retains their original flowability after storage at 150° C. under a nitrogen atmosphere for 8 hours.

14. A thermoplastic pulverulent composition, comprising pulverulent thermoplastic polyurethane obtained from a reaction of the following components:
a) at least one organic diisocyanate;
b) at least one compound having groups reactive toward isocyanate groups and having a number-average molecular weight of 500 g/mol to 6000 g/mol and a number-average functionality of a sum total of the components b) of 1.8 to 2.5;
c) at least one chain extender having a number-average molecular weight of 60 to 450 g/mol and a number-average functionality of the sum total of the chain extenders c) of 1.8 to 2.5;
in the presence of
d) optionally catalysts;
e) optionally auxiliaries and/or additives; and
f) optionally one or more chain terminators;
wherein the thermoplastic polyurethane has a melting range of 160 to 270° C. based on differential scanning calorimetry of a second heating run at heating rate 5 K/min, a Shore D hardness of 50 or more based on DIN ISO 7619-1, a melt volume flow rate at a temperature T of 5 to 15 cm$^3$/10 min based on ISO 1133, and a change in melt volume flow rate of ≥90 cm$^3$/10 min in the event of an increase in temperature T by 20° C., and
wherein the thermoplastic pulverulent composition is for production of articles in a powder based additive manufacturing method comprising:
applying a layer of particles to a target surface, wherein at least some of the particles include a fusible polymer, and wherein the fusible polymer comprises the thermoplastic polyurethane;
introducing energy into a selected portion of the layer corresponding to a cross section of the article in a chamber to bond the particles in the selected portion to form a bonded portion; and repeating the steps of applying and introducing energy for a multitude of layers to bond the bonded portions of adjacent layers in order to form the article.

\* \* \* \* \*